Feb. 2, 1932.    J. A. KIENAST    1,843,642
OBJECTIVE DEVICE FOR MULTICOLOR PHOTOGRAPHY AND CINEMATOGRAPHY
Filed Oct. 27, 1927    3 Sheets-Sheet 1

Inventor:-
Johann Arnold Kienast

Feb. 2, 1932.   J. A. KIENAST   1,843,642
OBJECTIVE DEVICE FOR MULTICOLOR PHOTOGRAPHY AND CINEMATOGRAPHY
Filed Oct. 27, 1927   3 Sheets-Sheet 2

Inventor:
J. A. Kienast.

Feb. 2, 1932.   J. A. KIENAST   1,843,642
OBJECTIVE DEVICE FOR MULTICOLOR PHOTOGRAPHY AND CINEMATOGRAPHY
Filed Oct. 27, 1927   3 Sheets-Sheet 3

Patented Feb. 2, 1932

1,843,642

UNITED STATES PATENT OFFICE

JOHANN ARNOLD KIENAST, OF BASEL, SWITZERLAND

OBJECTIVE DEVICE FOR MULTICOLOR PHOTOGRAPHY AND CINEMATOGRAPHY

Application filed October 27, 1927, Serial No. 229,242, and in Germany November 18, 1926.

In multi-colour photography and cinematography it is known for the photographic taking of juxtaposed divisional pictures of the same object by means of several adjacent juxtaposed dividing objectives, to mount in front of the latter an anterior preliminary objective for the purpose of producing parallel rays in front of the dividing objectives.

Such anterior objectives can consist of one or two optical members. In the latter case the front member is negative, the back member positive. Each of the members, for example lenses, can be in one part or in several parts. According to the invention an anterior objective is used consisting of a front negative member and a rear positive member. The anterior objective differs from known arrangements by a hitherto unknown large distance between the optical members, while the formation of parallel ray paths is not an essential condition. Parallel ray paths will be produced when the front focal point of the positive member falls within the virtual aerial image produced by the negative member. The parallel ray path appertains in that case only to the plane in the object space conjugate with a virtual image plane perpendicular to the axis, and there is no parallax effect for this plane with the dividing objectives lying behind the anterior objective, eccentric to the axis thereof. For all nearer or further object planes the ray paths are no longer parallel, so that they must cause more or less parallax with the dividing objectives, according as they are further from or nearer to the conjugate object plane. For multicolour photography and cinematography it is however an extremely important requirement to reduce parallax for the whole object space depth as much as possible. The principal purpose of the present invention is to fulfill this requirement by new means.

As already stated, the parallel ray path is not adapted by itself to reduce parallax for the whole object space depth; in the most advantageous case however parallax can be ± halved, if the optical members of the anterior objective are so set axially that the front focal point of the positive member falls in the middle of the virtual image depth. The same effect can, however, be obtained by other means and will be presumed known.

The hitherto known two member anterior objectives of the described kind served exclusively for producing parallel ray paths. For this purpose alone, as well as for the correction of the optical faults of the system it suffices for the adjacent principal points, that is the rear principal point of the negative optical member and the front principal point of the positive optical member, to lie fairly closely together. In no known case is this distance greater than half the focal length of the negative optical member. On the contrary, in the interests of the light strength, but in view of the dispersive action of the negative optical member, the distance between the two principal points has always been made as small as possible, and the other important effect of this distance, consisting in that the extent of parallax partially depends thereon, has been hitherto unrecognized and unused.

According to the present invention, by suitable means, with the use of a two member anterior objective in front of a group of principal dividing objectives, the parallax for the latter is decreased much more than hitherto, whereby the said principal dividing objectives are so arranged as to have their optical axis laterally displaced with respect to the optical axis of the said preliminary objective and to project real images on the sensitized film or surface. The means therefor are obtained by the constructive use of the fact that parallax can be reduced by any desired amount, if the distance between the two adjacent principal points of the two optical members of the anterior system is made greater than is required by the bare production of parallel ray paths and the correction of the optical faults, in addition to the necessary play for adjustment of the optical members. The hitherto assumed upper limit of this distance has been half the focal length of the negative member. The reduction in parallax made possible by the new means applies to the whole space depth and not only to a single plane in the object space, so that groups of divisional pictures can be taken photographically which are suitable for practical recomposition of natural colour pictures, since the divisional pictures ensure a sufficiently accurate superposition on the screen.

In order to achieve this purpose, according to the invention, in a two member anterior objective of the described kind, with or without parallel ray paths, the two optical members are so set in relation to one another that the distance between the rear principal point of the negative optical member and the front principal point of the positive optical member is greater than half the focal length of the negative optical member, and may be a multiple of this focal length. The reason for the reduction of parallax by these means lies in the fact that the large distance between the two optical members also permits an increased distance between the dividing objectives and the anterior system. Since the positive member of the anterior objective co-acts with each dividing objective as a summary positive member of the whole photographic system, the depth of the virtual image appears reduced owing to the large distance between the positive members and the negative member, since the visual angle for the dividing objectives is smaller than is the case with a smaller distance. It may be conceded that this last effect can also be achieved in known manner with an anterior system consisting only of a negative optical member, assuming that the distance between this member and the dividing objectives is sufficiently great. Such a single member anterior system has, however, the disadvantage compared with the present invention, that the ray beams fall upon the dividing objectives with a much greater inclination and that the correction of the whole optical system is much less complete. An important advantage of the two member anterior objective over the single member anterior objective further lies in the fact that, particularly with exactly parallel ray paths, similar object rays fall on the various dividing objectives with the same inclinations, and the distribution of the rays in relation to the axes of the dividing objectives is symmetrical. The anterior objective according to the invention therefore unites the advantages of the known single form with those of the known two member form.

The accompanying drawings, which serve for further explanation, show diagrammatically the invention, and also a practical example of the invention.

Figure 1:
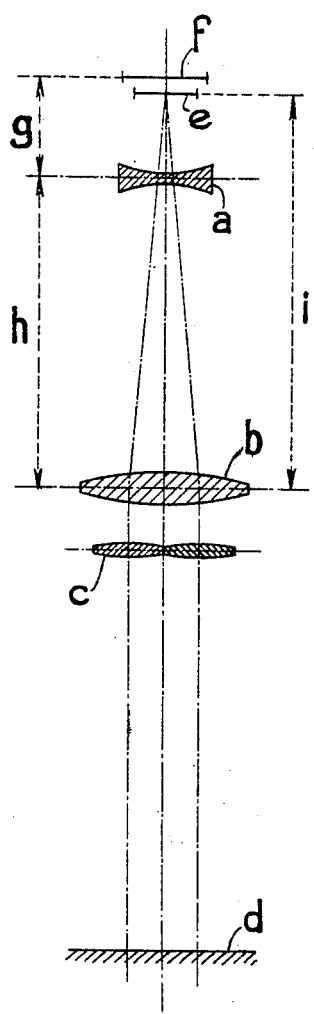
Figure 1 shows diagrammatically the optical system of a two member anterior objective arrangement according to the invention.

In all these figures the same reference characters have the same meaning. The optical members are shown throughout as lenses. In the diagrammatic figures the juxtaposed separating objectives are shown for simplicity as condensing lenses. It has also been assumed for the same reason in the diagrammatic figures that the two principal points of each lens are united in the centre point thereof.

In Figure 1, $a$ is the negative, $b$ the positive optical member of the known two member anterior objective, $c$ are two juxtaposed dividing objectives having their optical axis laterally displaced with respect to the optical axis of the said anterior two member objective, and $d$ is the plane of the photographic plate or other sensitized surface; $e$ is the virtual aerial image produced by the member $a$ of an object plane at right angles to the optic lens axis at a finite distance, and $f$ that of a similar object plane at infinity; $g$ is therefore the rear focal length of the member $a$, and $i$ is the front focal length of the member $b$ set for parallel paths for rays from plane $e$. $h$ is the distance between the adjacent principal points of the two members $a$ and $b$ of the anterior system.

There are parallel paths for rays from $e$ between the anterior objective and the dividing objectives, and the factor controlling the reduction of parallax is the ratio $$\frac{h}{g} \text{ or } \frac{h+g}{g}$$

in general, and $$\frac{i}{g}$$

in particular for parallel ray paths. The distance $h$ may be adjustable. For the same scale of the juxtaposed images the necessary focal length of the dividing objectives according to Figure 1 is much greater than that corresponding to the ratio $$\frac{h+g}{g} = 0.5g.$$

This is a further advantage of the invention since large focal lengths render possible better correction of optical faults.

In the diagrammatic figures the distance $e-f$ is the depth of the virtual aerial image and $c-d$ is the real image distance of the dividing objectives.

In known arrangements the upper limit for the distance between the adjacent principal points of the two optical members of the two member anterior objective of the kind shown in Figure 1 has been taken as half the focal length of the negative optical member. The characteristic feature of the new anterior objective resides in the setting of the two members $a$ and $b$ at a distance substantially exceeding this limit, whether parallel ray paths are provided or not.

Figure 2:
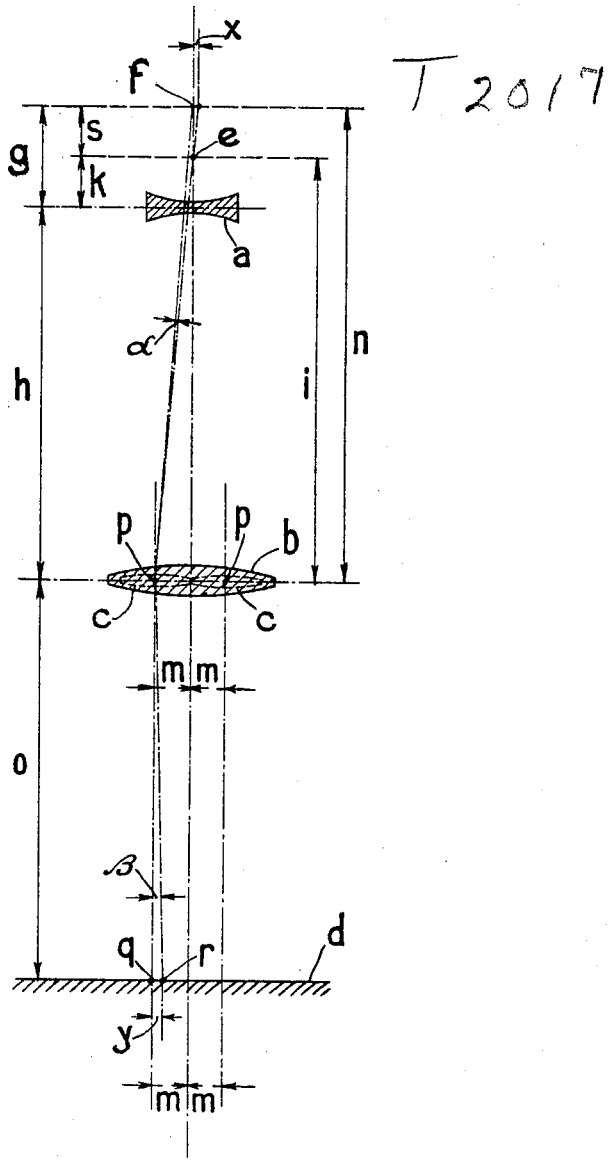
Figure 2 shows the optical system of Figure 1 in a form, suitably modified for explaining a numerical example.

Figure 2 relates to Figure 1 and serves for the calculation of a numerical example as a proof of the above statements. The front focal point of the positive member $b$ lies in $e$, so that member $b$ renders rays from $e$ parallel, whereby the calculation is simplified. With parallel rays the distance between the dividing objectives $c$ and the member $b$ is theoretically of no importance; the distance can also be made zero. Accordingly $b$ and $c$ are assumed united in the eccentric points $p$ in Figure 4. Their equivalent focal length $$f = \frac{i \cdot o}{i + o},$$

$i$ being the object distance of the combined lenses $b$ and $c$ from $e$, and $o$ the image distance.

The virtual depth $e - f = s$ is exaggerated in Figure 2 to give sufficient room to show the rays $p\,e$ and $p\,f$; $o$ is both the image distance and the focal length of $c$. $q$ is the real image point of $e$ and $r$ of $f$. The distance $q - r = y$ indicates the parallax on the plate $d$. Two material points lying on the optic axis of the anterior objective in the object space have been assumed as the object. $e$ is the virtual image of the object point at finite distance and $f$ that of the object point at infinity, $g$ therefore being the focal length of the lens $a$. The angles $\alpha$ and $\beta$ are practically equal to one another.

For simplicity, the sizes of the real and virtual images of the object point at finite distance are assumed to be equal, so that the combination $p$ of the lenses $b$ and $c$ forms an image on the plate $d$ of equal size to the virtual image $e$. $p$ then lies midway between $d$ and $e$ and $o = i$, or owing to the smallness of $s$ approximately $o = n$. In consequence $$f = \frac{i}{2} = \frac{o}{2} = \frac{n}{2}.$$

Similarly without noticeable error $y = x$. Then the parallax from the space between the two object points is $$y = \frac{s}{i} \cdot m.$$

Assuming that $s$ and $m$ are given in this equation, then $y$ and $i$ are inversely proportional, or $i \cdot y$ constant. The general dependence of the size of $y$ on $$\frac{h}{g}$$

can be similarly deduced. In the practical embodiment small deviations from the calculated ratio may occur since part of the basic assumptions only apply for the diagram. The principle is not affected, however, either for parallel or non parallel ray paths. Neither is the question whether the reduction of parallax is exactly or only approximately proportional to $$\frac{h}{g} \text{ or } \frac{i}{g} \text{ or } \frac{h+g}{g}$$

germane to the principle of the invention, but is purely a matter for the computing optician.

The two following numerical examples refer to parallel ray paths for $e$. For both examples, in millimetres
$g = 20$
$m = 6.9$
$o = i$
$E = 3000$ is the distance of the first object point
$E = \infty$ that of the second, from $a$.
Then $$k = \frac{E}{\frac{E}{g} + 1} = 19.867$$

and $s = 0.133$.

*1st Example.*—$i = o$ taken as 1.5 $g = 30$ mm. Then $$y = \frac{0.133}{30} \cdot 6.9 = 0.03059 \text{ mm.}$$

*2nd Example.*—$i = o$ taken as 4 $g = 80$ mm. Then $$y = \frac{0.133}{80} \cdot 6.9 = 0.01147 \text{ mm.}$$

With 400 fold magnification the parallax on the projection screen is for each example respectively
$P_1 = 400 \cdot 0.03059 = 12.236$ mm.
$P_2 = 400 \cdot 0.01147 = 4.588$ mm.
As can be seen $$\frac{P_1}{P_2} = \frac{i_2}{i_1} = \frac{80}{30} = 2.666$$

Figure 3:
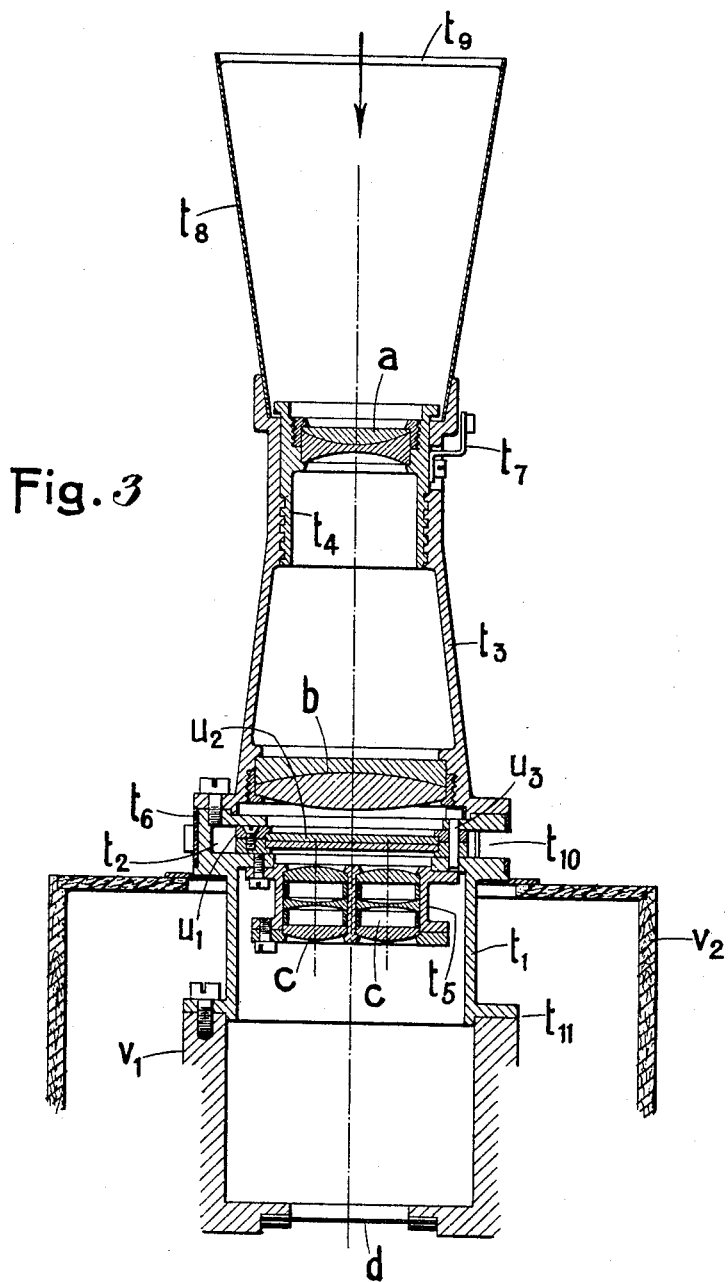
Figure 3 shows in longitudinal section a practical embodiment of a complete photographic objective with a two member anterior objective arranged according to the invention, applied to a film camera.
Figure 4:
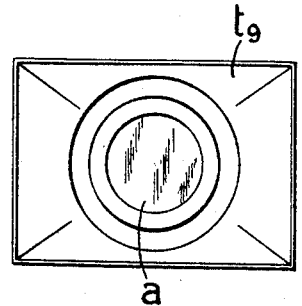
Figure 4 is a partial front view thereof.

In Figure 3 the make up of a complete photographic objective, as used according to the invention on a camera for taking natural colour cinematograph films is shown as an example in longitudinal section; $a$ is the negative, $b$ the positive optical member of the anterior objective, each member consisting of two cemented lens components. The principal points are not shown for any of the lenses, since their relation to the invention is sufficiently indicated by the diagrammatic figures. The distance between the adjacent principal points of the anterior system is however a multiple of the focal length of the negative optical member. $c$ are two juxtaposed principal dividing objectives, each consisting of three separate lenses, which however in itself has no connection with the invention, since it relates to the feature that both the anterior objective and the dividing objectives should in any practical construction be as well corrected optically as possible. Instead of two, three or more dividing objectives can be grouped together. The dividing objectives are so arranged that their optical axis is laterally displaced with respect to the optical axis of the anterior objective and that they project real images on the sensitized surface. This latter is formed here by a film $d$, guided in the usual manner in a picture gate. $t_1$ to $t_{11}$ are parts of the mounting for the optical members. The part $t_4$ carries the objective member $a$ and is screwed into the tubular part $t_3$ carrying the objective member $b$ so as to allow axial adjustment of the member $a$, the part $t_4$ being provided with a scale indicator $t_7$. At the front end of the part $t_3$, there is mounted a funnel $t_8$ serving as diaphragm. This funnel has at its front entrance $t_9$ a right angle cross section as shown in Figure 4. This entrance forms a gate, multiple juxtaposed images of which are projected on a reduced scale on the film by the optical system and so serve as frames for the individual separate images.

Within the piece $t_1$ there is provided a chamber $t_2$ between the preliminary objective and the dividing objectives, which serves to receive a frame $u_1$ with light filters $u_2$. $t_{10}$ is a slot in the peripheric wall of the chamber $t_2$. The frame $u_1$ is rotatable on an eccentric pin $u_3$ and can be swung out of the chamber $t_2$ through the slot $t_{10}$ when the filters are not to be used. $t_6$ is a ring slide and serves to close said slot $t_{10}$ against undesired access of light or to open it for the withdrawal of the filter frame. The whole objective is secured to the camera $v_1$, $v_2$ at $t_{11}$. The direction of the light rays is indicated by an arrow.

The negative optical member $a$ of the anterior system produces a virtual aerial image of small depth of the object to be photographed, in the funnel $t_8$. If, however, the object is a plane, for example a wall or a painting, the aerial image also lies in a plane. The positive optical member $b$ receives the rays apparently coming from the virtual aerial image and transmits them in a corresponding arrangement to the dividing objectives $c$ which throw the real divisional images of the object on the film $d$, as many divisional images as there are dividing objectives. For the invention it is not absolutely necessary that parallel ray paths should exist between $b$ and $c$.

Since a different coloured light filter lies before each dividing objective, each transmits to the film only those image rays which can pass through its respective filter. Accordingly, for three colour photography for example there thus appear—in black and white—at each exposure a group of divisional pictures consisting of the so-called red, green and blue pictures which later in recomposition with the use of similar filters unite on the screen to form a natural colour picture without overlapping and without undesirable coloured edges. In order that this may be effected as well as possible, in the first place care must be taken in exposure that the parallax for each set of divisional pictures is as small as possible and that the dividing objectives produce separate images as nearly congruent as possible. In the second place care must be taken that the objective is simply and practically constructed so that it can be directly attached to a normal camera. In the third place care must be taken in exposure that the separate divisional images on the plate do not overlap at their margins. These conditions are fulfilled by the objective of Figure 5 constructed according to the invention.

Figure 5:
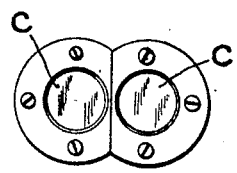
Figure 5 is a diagrammatic front view of the dividing objectives of Figure 3.
Figure 6:
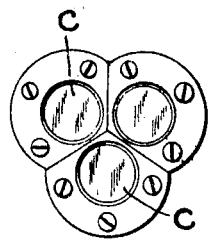
Figures 6 and 7 show modifications of the arrangement of the dividing objectives, when there are used three or four of such objectives.
Figure 7:
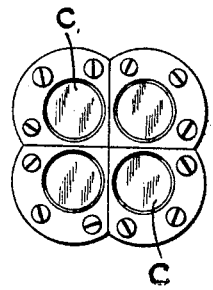

Whilst Figures 3 and 5 show a device with two dividing objectives $c$ only, it is obvious that there may also be used three, four and more principal dividing objectives $c$, as shown by the diagrammatic views of Figures 6 and 7.

What I claim is:—

1. A photographic objective device for multi-colour photography and cinematography, having an anterior preliminary objective and several principal dividing objectives behind the same, the preliminary objective comprising a negative optical front member and a separate positive optical back member to project as a whole an image of a scene at a very large distance in space, the principal dividing objectives being so arranged as to have their optical axes laterally displaced with respect to the optical axis of the preliminary objective and to project real images on a sensitized surface, and said front and back members of the preliminary objective being so placed that the distance between the rear principal point of the negative member and the front principal point of the positive member is greater than half the focal length of the negative member of the preliminary objective, for the purpose described.

2. A photographic objective device for multicolour photography and cinematography, having an anterior preliminary objective and several principal dividing objectives behind same, the preliminary objective comprising a negative optical front member and a separate positive optical back member to project as a whole an image of a scene at a very large distance in space, the principal dividing objectives being so arranged as to have their optical axes laterally displaced with respect to the optical axis of the preliminary objective and to project real images on a sensitized surface, and said front and back members of the preliminary objective being so placed that the distance between the rear principal point of the negative member and the front principal point of the positive member is greater than half the focal length of the negative member of the preliminary objective, a central diaphragm being provided in front of said preliminary objective at a distance greater than the focal length of said negative member and having a rectangular opening of determined form, size and distance symmetrically arranged to the optical axis of the preliminary objective suitable for the taking operation to frame the divisional pictures on the sensitized surface, for the purposes described.

3. A photographic objective device for multicolour photography and cinematography, having an anterior preliminary objective and several principal dividing objectives behind same, the preliminary objective comprising a negative optical front member and a separate positive optical back member to project as a whole an image of a scene at a very large distance in space, the principal dividing objectives being so arranged as to have their optical axes laterally displaced with respect to the optical axis of the preliminary objective and to project real images on a sensitized surface, and said front and back members of the preliminary objective being so placed that the distance between the rear principal point of the negative member and the front principal point of the positive member is greater than half the focal length of the negative member of the preliminary objective, a central tubular member having a diaphragm in front of said preliminary objective at a distance greater than the focal length of said negative member and comprising a rectangular opening of determined form, size and distance suitable for the taking operation to frame the divisional pictures on the sensitized surface, for the purpose described.

4. A photographic objective device for multicolour photography and cinematography, having an anterior preliminary objective and several principal dividing objectives behind same, the preliminary objective comprising a negative optical front member and a separate positive optical back member to project as a whole an image of a scene at a very large distance in space, the principal dividing objectives being so arranged as to have their optical axes laterally displaced with respect to the optical axes of the preliminary objective and to project real images on a sensitized surface, and said front and back members of the preliminary objective being so placed that the distance between the rear principal point of the negative member and the front principal point of the positive member is greater than half the focal length of the negative member of the preliminary objective, a central tubular diaphragm in front of the preliminary objective with a rectangular gate, a chamber between the preliminary objective and the dividing objectives, having a slot in its peripheric wall, a frame with light filters located in said chamber, and means to allow of withdrawing the filter frame from said chamber through said slot, for the purpose described.

5. A photographic objective device for multicolour photography and cinematography, having an interior preliminary objective and several principal dividing objectives behind same, the preliminary objective comprising a negative optical front member and a separate positive optical back member to project as a whole an image of a scene at a very large distance in space, the principal dividing objectives being so arranged as to have their optical axes laterally displaced with respect to the optical axes of the preliminary objective and to project real images on a sensitized surface, and said front and back members of the preliminary objective being so placed that the distance between the rear principal point of the negative member and the front principal point of the positive member is greater than half the focal length of the negative member of the preliminary objective, a central tubular diaphragm in front of the preliminary objective with a rectangular gate, a chamber between the preliminary objective and the dividing objectives, having a slot in its peripheric wall, a frame with light filters located in said chamber, said frame being turnable about an eccentric axis for withdrawing same out of said chamber through said slot, and a ring slide for closing or opening said slot, for the purpose described.

In witness whereof I have hereunto signed my name this 14th day of October 1927.

JOHANN ARNOLD KIENAST.